United States Patent [19]

Sheridan et al.

[11] Patent Number: 5,111,577

[45] Date of Patent: May 12, 1992

[54] PAD INCLUDING HEAT SINK AND THERMAL INSULATION AREAS

[75] Inventors: William M. Sheridan, St. Louis; Raymond E. Ragland, Union, both of Mo.

[73] Assignee: ATD Corporation, St. Louis, Mo.

[21] Appl. No.: 638,460

[22] Filed: Jan. 8, 1991

Related U.S. Application Data

[62] Division of Ser. No. 468,425, Jan. 22, 1990, Pat. No. 5,011,743.

[51] Int. Cl.$^5$ .................... B21D 53/00; B21K 29/00; P23P 15/26
[52] U.S. Cl. ............... 29/890.039; 29/890.03; 29/460; 29/469.5
[58] Field of Search ............ 29/890.03, 890.039, 29/460, 469.5, 527.2

[56] References Cited

U.S. PATENT DOCUMENTS

| | | | |
|---|---|---|---|
| 3,757,856 | 9/1973 | Kun | 29/890.039 X |
| 4,298,061 | 11/1981 | Hoeffken | 29/890.039 X |
| 4,352,393 | 10/1982 | Vidal-Meza | 29/890.039 X |
| 4,434,643 | 3/1984 | Almqvist et al. | 29/890.039 X |
| 4,600,053 | 7/1986 | Patel et al. | 29/890.039 X |
| 4,603,460 | 8/1986 | Yano et al. | 29/890.039 X |
| 4,678,115 | 7/1987 | Weisert | 29/890.039 X |
| 4,688,631 | 8/1987 | Peze et al. | 29/890.039 X |
| 4,926,935 | 5/1990 | Haushalter | 29/890.03 X |

Primary Examiner—Timothy V. Eley
Assistant Examiner—C. Richard Martin
Attorney, Agent, or Firm—Burns, Doane, Swecker and Mathis

[57] ABSTRACT

A pad including thermal insulation and heat sink areas. The pad includes a plurality of layers of metal foil forming a stack with the layers arranged one above the other, the stack including at least one heat sink area and at least one insulating area adjacent to the heat sink area, the layers providing better heat conduction in the vertical direction at the heat sink area than at the insulating area. At least one of the layers includes a plurality of embossments therein separating the one layer from an adjacent one of the layers in the insulating area. The pad can include a single insulating area surrounded by a heat sink area and a black coating can be provided on selected portions of the layers to improve heat radiating characteristics of the pad. For instance, the heat sink area can be coated with the black coating to radiate heat away from the pad at a desired location. The pad is particularly useful in shielding a heat sensitive component on one side of the pad from a heat source on the other side of the pad.

19 Claims, 2 Drawing Sheets

PAD INCLUDING HEAT SINK AND THERMAL INSULATION AREAS

This application is a divisional of application Ser. No. 07/468,425, filed Jan. 22, 1990, now U.S. Pat. No. 5,011,743.

FIELD OF THE INVENTION

The present invention relates to a heat insulating pad including heat sink and thermal insulating areas which can be used as a heat reflecting shield as well as a heat sink for dissipating heat at a desired location.

BACKGROUND

Various pads, panels and structural elements have been proposed for heat insulation purposes. For instance, U.S. Pat. No. 2,180,373 ("Sibley et al") discloses a heat insulating panel which includes a metal basket, a heat reflective inner lining covering the inner walls of the basket and a plurality of thin strips of heat reflective material, such as thin aluminum foil, which has been crumpled by hand or any suitable means to form a large number of irregular surfaces which provide point contact between the layers. The thin aluminum foil strips disclosed in Sibley et al can be fastened at each end thereof to the inner lining of the basket and a cover can be provided on the basket to encase the lining and the thin aluminum foil layers therein.

Sibley et al disclose that the inner lining in the baskets serves to reflect the majority of the radiant heat back against the surface on which the insulation is applied resulting in quick preheating or quick cooling of the surface, as desired. Sibley et al also disclose that the inside face of the cover can include a heat reflective surface which will reflect the major portion of the radiant heat that may be carried by convection currents through the surrounding edges of the insulation in the panel back toward its source which effects minimum heat transfer at all joints. Sibley et al also disclose that the heat reflective material should be spaced apart sufficiently to provide heat insulating air spaces between the stripe an air space of approximately ⅜ of an inch being suitable for this purpose. Accordingly, Sibley et al disclose a device which reflects heat back toward its source rather than directing the heat from one portion of the heat insulating panel to another portion thereof to thereby dissipate the heat.

U.S. Pat. No. 1,934,174 ("Dyckerhoff") discloses a heat insulating body which includes a plurality of metal foil sheets which have been stamped, bent or crumpled to form projections which maintain the sheets in point contact when assembled in a stack. Dyckerhoff discloses that the foil can be crumpled or distorted by hand or machine and applied to the surface of the member to be insulated, it being unnecessary to lock these sheets to each other to maintain the irregular shape necessary to provide thick air spaces. Dyckerhoff discloses that the average spacing of the sheets can be about 1 cm but ordinarily will be between 0.5-2 cm, the sheets having a thickness which may be less than 0.2 mm and even as thin as 0.005 or thinner.

Dyckerhoff discloses that a protective casing can be provided to protect the insulation from outside pressures but when the insulation is used for filling air spaces created by the usual structural members, such as walls or ceilings, no special casing is necessary whereas in the case of making pipe coatings, an outside shell which may be made of metal heavier than the foil is advisable. Dyckerhoff discloses that it is not necessary for all of the sheets to be crumpled and the heat insulating body can include an intermediate sheet which remains flat. Dyckerhoff does not disclose any means for directing heat from one part of the insulating body to another part thereof.

U.S. Pat. No. 2,926,761 ("Herbert, Jr."), U.S. Pat. No. 4,343,866 ("Oser et al") and U.S. Pat. No. 4,386,128 ("Yoshikawa") disclose a heat insulating panel comprised of a plurality of thin sheets of metal. None of these references teach or suggest a heat insulating pad or panel which includes means for directing heat from one part to another thereof. U.S. Pat. No. 1,974,665 ("Schnetzer et al"), U.S. Pat. No. 2,441,476 ("Ewald"), U.S. Pat. No. 2,481,046 ("Scurlock"), U.S. Pat. No. 2,963,128 ("Rapp"), U.S. Pat. No. 3,029,910 ("Kirk et al"), U.S. Pat. No. 4,025,996 ("Saveker"), U.S. Pat. No. 4,318,965 ("Blair") and U.S. Pat. No. 4,703,159 ("Blair") disclose structural panels which include a plurality of metal layers which are fastened together. None of these patents teach or suggest a heat insulating pad or panel which includes means for directing heat from one part to another thereof.

SUMMARY OF THE INVENTION

An object of the present invention is to provide a pad including thermal insulation and heat sink areas whereby the pad can be used as a heat reflecting shield as well as a heat sink for dissipating heat at a desired location.

In accordance with a preferred embodiment of the invention, the pad includes heat sink and thermal insulating areas, the heat sink area conducting a greater amount of heat between opposite surfaces of the pad than does the thermal insulating area. The pad includes a plurality of layers of metal foil forming a stack wherein the layers are arranged one above another in a vertical direction the stack including at least one heat sink area wherein the layers are closer together in the vertical direction than at at least one insulating area of the stack adjacent to the heat sink area, at least one of the layers including a plurality of embossments therein separating the one layer from an adjacent one of the layers in the insulating area. In particular, the heat sink area can comprise a compressed outer periphery of the stack which extends horizontally in a transverse direction perpendicular to the vertical direction completely around the insulation area, the layers at the outer periphery being secured together by securing means. The pad can include a single insulating area or a plurality of insulating areas and the heat sink area can partially surround an insulating area or can completely surround the insulating area.

In one embodiment of the invention, the layers are in contact with each other in the heat sink area and the securing means comprises a mechanical bond such as staples or other equivalent between the layers in at least part of the heat sink area. In another embodiment, the securing means comprises at least one opening defined by sheared surfaces of the layers, each of the sheared surfaces extending in the vertical direction above and below a plane which is coplanar with facing surfaces of two of the layers. In another embodiment, the securing means comprises frame means for supporting the heat sink area, the frame means comprising an open frame, pan or other suitable equivalent. In a further embodiment, the securing means comprises an adhesive between the layers.

In accordance with the invention, the embossments can be provided in a pattern on only one of the layers or a pattern of the embossments can be provided on at least two of the layers, the layers being arranged such that at least some of the embossments are not aligned in the vertical direction. In one embodiment of the invention, at least two of the layers adjacent to each other include a pattern of the embossments, the layers being aligned in the vertical direction such that at least some of the embossments are aligned in the vertical direction. The embossments can be provided such that on one side of a medial plane passing through the pad face away from the medial plane, the medial plane being perpendicular to the vertical direction. The embossments can also be provided such that at least some of the embossments form depressions on one side of a respective one of the layers and bumps on an opposite side of the respective layer.

In accordance with the invention, at least one of the layers of the pad can include heat radiating means thereon. The heat radiating means can comprise a black surface on at least part of at least one side of at least one of the layers. The black surface can extend over only part of one side of a layer or over the entire surface of the layer. If the pad is used to shield sensitive equipment such as electrical components from a heat source, the insulating area of the pad can be provided such that it faces the heat source and the surface of the insulating area facing the heat source can be a reflective surface. To dissipate heat from the pad, the heat radiating means such as a black surface can be provided on one or more portions of the pad located away from the site which is to be shielded from the heat. For instance, if the outer periphery of the pad or part thereof is located in an area exposed to circulating air which thus would facilitate removing heat from the pad, the pad can include a black coating in such areas. Additionally, the black surface coating can be provided on the individual sheets in any pattern or on any parts thereof which will facilitate removing the heat to the heat sink area or heat sink areas. For instance, if opposite edges of the pad will be located in area exposed to circulating air, these edges of the pad can be coated with the black surface coating and even the individual layers in such areas can be coated with the black surface coating to facilitate radiation of heat from the pad.

In accordance with the invention, the pad can include at least one layer of scrim. The scrim can comprise a heat resistant material and can be interposed between facing surfaces of two of the layers adjacent to each other. In accordance with the invention, it is not necessary that each of the layers include the embossments. For instance, at least one of the layers can comprise a flat sheet free of the embossments, the flat sheet being interposed between layers having embossments thereon. The embossments can be provided in a uniform pattern on each of the sheets or the pattern can be provided in a non-uniform or random pattern. Furthermore, the embossments can have the same height on all of the sheets or can have varying heights. In addition, the embossments can be provided such that they face the same direction on each of the sheets or the embossments can be provided such that they extend away from only one side of each of the sheets or the embossments can extend away from both sides of at least one of the sheets.

Another object of the invention is the provide a method of making a heat insulating pad having insulating and heat sink areas. The method comprises a step of assembling a plurality of layers of metal foil in a stack wherein the layers are arranged one above another in a vertical direction, at least two of the layers being separated from each other by a plurality of embossments on at least one of the layers and a step of compressing the stack such that heat sink and insulating areas are formed therein and the layers are closer together in the vertical direction in the heat sink area than in the insulating area.

The method of the invention can include a step of embossing a plurality of the layers such that a plurality of the embossments are formed therein, the embossing step being performed by simultaneously embossing a plurality of overlapping sheets of the metal foil, each of the sheets after the embossing step comprising a respective one of the layers. The assembling step can comprise separating the sheets after the embossing step and offsetting them with respect to each other such that at least some of the embossments on two of the sheets facing each other are not aligned in the vertical direction.

In accordance with the method of the invention, a step of securing the layers together in the heat sink area can be provided. The securing step can include hermetically sealing the heat sink area. Alternatively, the step of securing the layers together in the heat sink area can comprise interengaging the layers with each other by forming at least one opening extending in the vertical direction through the layers in the heat sink area, the at least one opening being formed by passing a punch through the layers. The at least one opening can comprise a plurality of openings and the punch can include a plurality of spaced-apart projections, each of which forms a respective one of the openings. The compressing and securing steps can be simultaneously performed with a composite tool comprising a compressible material which performs the compressing step and the punch which performs the securing step, the compressible material and the punch being mounted together in side-by-side relationship.

The method according to the invention can also include a step of cutting the stack. In particular, the cutting step can be performed such that the heat sink area lies between the insulating area and an outer edge of the stack. The cutting step can be performed simultaneously with the compressing and securing steps. In particular, the cutting, compressing and securing steps can be simultaneously performed with a composite tool comprising a compressible material for compressing the layers, a punch for securing the layers and a cutter for cutting the layers, the compressible material being mounted between the cutter and the punch, the compressible material contacting the stack before the cutter and the punch contact the stack during the simultaneously cutting, compressing and securing steps, the compressible material being compressed to a predetermined amount and compressing the stack in the heat sink area when the cutter cuts the stack and the punch punches the at least one opening.

The method according to the invention can include a step of inserting at least one scrim layer in the stack and can include a step of coating at least part of at least one of the layers with heat radiating means, the heat radiating means comprising a black coating and the coating step comprising coating at least part of the heat sink area with the black coating.

BRIEF DESCRIPTION OF THE DRAWINGS

The invention will now be described with reference to the accompanying drawings, in which.

DETAILED DESCRIPTION OF THE PREFERRED EMBODIMENT

According to the invention, a pad 1 is provided which can be used as a heat reflecting shield as well as a heat sink for dissipating heat at a desired location. The pad is particularly useful for providing "hot spot" insulation wherein the pad which is larger than a heat source can be used to shield an area in the vicinity of the heat source by radiating heat back towards the heat source and conducting heat which penetrates the pad to a desired location such as along the outer periphery of the pad. For instance, if a heat source is at a temperature of 250° C. it is possible to reduce the temperature on a side of the pad facing away from the heat source to a lower temperature such as around 0° C. On the other hand, heat which penetrates the pad can be conducted to a heat sink area of the pad. For instance, if the heat sink area is located at the outer periphery of the pad, it is possible to carry heat away from a center zone of the pad. In accordance with the invention, the heat sink area conducts heat from the surface of the pad facing the heat source to the opposite surface with a lower temperature therebetween than in the area of the pad facing the heat source. For instance, the center of the pad can comprise a thermal insulating area with a temperature differential of 200° C. between the surface facing the heat source and an opposite surface of the pad whereas the heat sink area of the pad can have a temperature differential of about 25° C. between the surface of pad facing the heat source and an opposite surface thereof.

Figure 1:
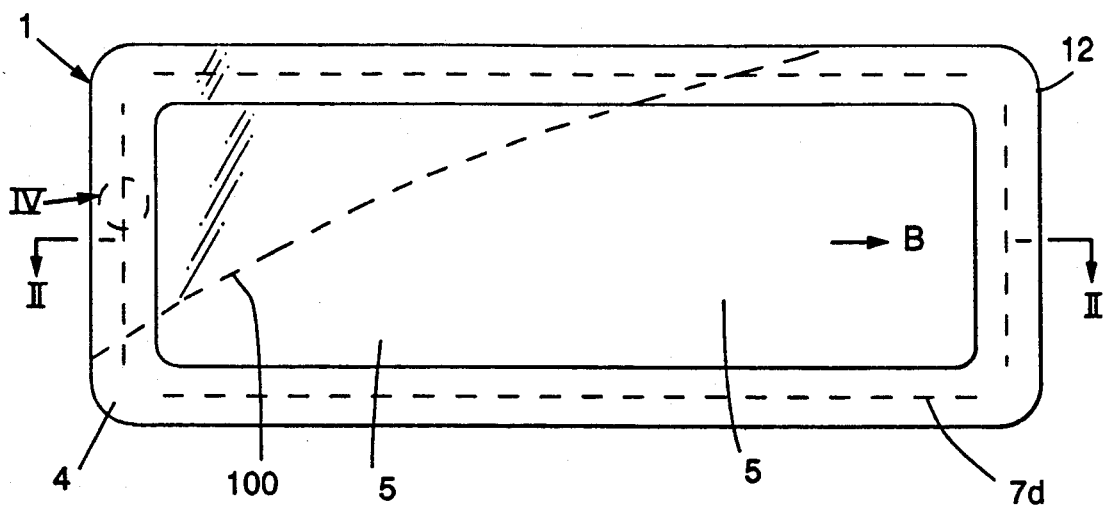
FIG. 1 shows a top view of the pad according to the invention.
Figure 2:
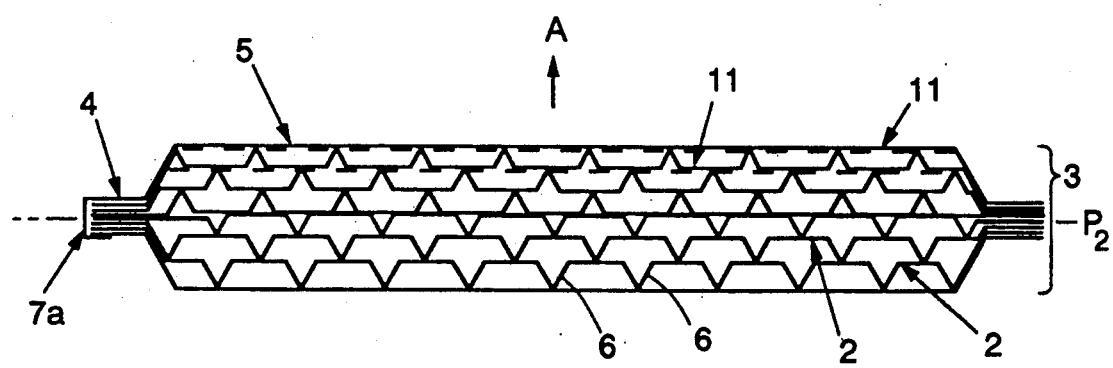
FIG. 2 shows a cross section of the pad shown in FIG. 1 taken along the line II—II.

As shown in FIGS. 1-2, the pad 1 according to the invention includes a plurality of layers 2 of metal foil which makes the pad flexible. The metal foil can comprise aluminum, copper, gold or any other suitable metal or alloy. The thickness of the layers can have any thickness but a thickness of 2 mils has been found satisfactory. The layers, however, can have different thicknesses or the thickness of each layer can be the same. The layers are preferably aluminum foil since the reflectivity of aluminum is on the order of 95% and the emission thereof is on the order of about 10%. The emissivity of the sheets can be dramatically increased, however, by coating the aluminum sheets with a black surface coating. Of course, the reflectivity of the sheets decreases proportionally to the emissivity. Accordingly, the pad 1 of the invention can be designed with a particular use in mind, that is, the layers 2 of the pad can be made brighter at areas which should remain cool and can be made darker at areas where it is desired to radiate heat from the pad.

Figure 3:
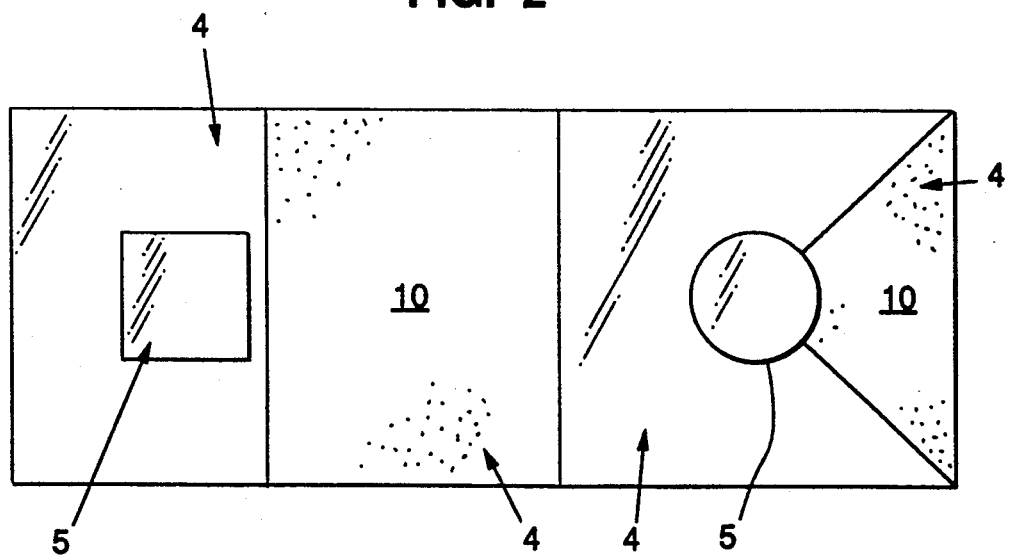
FIG. 3 shows a top view of a pad according to another embodiment of the invention.
Figure 5:
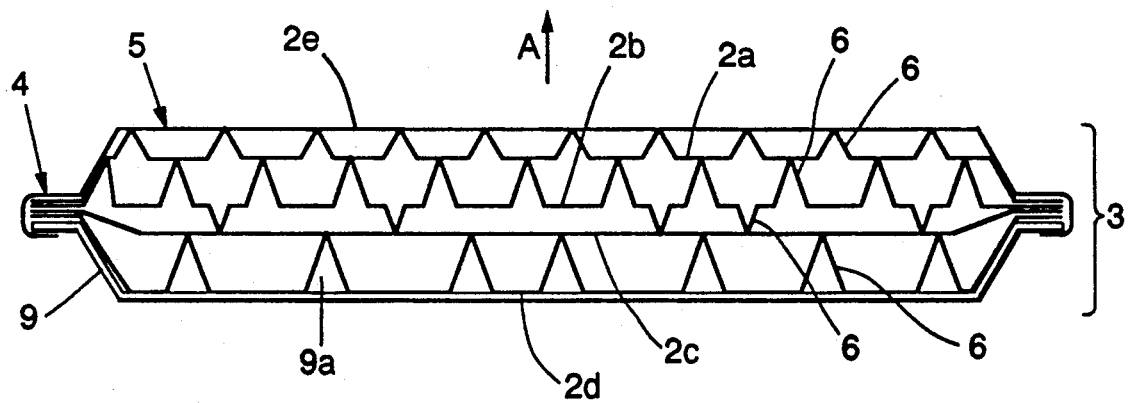
FIG. 5 shows a cross-sectional view of a pad according to another embodiment of the invention.
Figure 6:
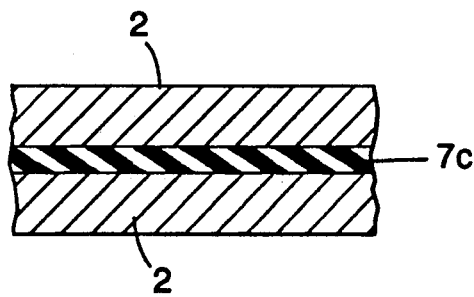
FIG. 6 shows a cross-section of two layers of the pad shown in FIG. 1 with adhesive securing means therebetween.

As shown in FIGS. 2 and 5, the layers 2 are provided in a stack 3 wherein the layers 2 are arranged one above another in a vertical direction A. The stack 3 includes at least one heat sink area 4 wherein the layers are closer together in the vertical direction than at at least one insulating area 5 of the stack adjacent to the heat sink area 4. At least one of the layers includes a plurality of embossments 6 therein separating the at least one layer from an adjacent one of the layers in the insulating area 5. The pad 1 can include a single insulating area 5 as shown in FIG. 1 or a plurality of insulating areas 5 as shown in FIG. 3. The heat sink area 4 can extend completely around the outer periphery of the pad (as shown in FIG. 1) or the outer periphery can be left open in one or more areas. The layers 2 in the heat sink area can be in contact with each other or not in direct contact with each other but the layers 2 in the heat sink area 4 should provide better heat conduction in the vertical direction than at the insulating area.

In a preferred embodiment, the at least one insulating area 5 comprises a single insulating area 4 located centrally in the pad as shown in FIG. 1. In this embodiment, the heat sink area 4 comprises a compressed outer periphery of the stack which extends horizontally in a transverse direction B perpendicular to the vertical direction A completely around the insulating area, the layers at the outer periphery being secured together by securing means 7 and being closer together in the vertical direction at the heat sink area than at the insulating area.

Figure 4:
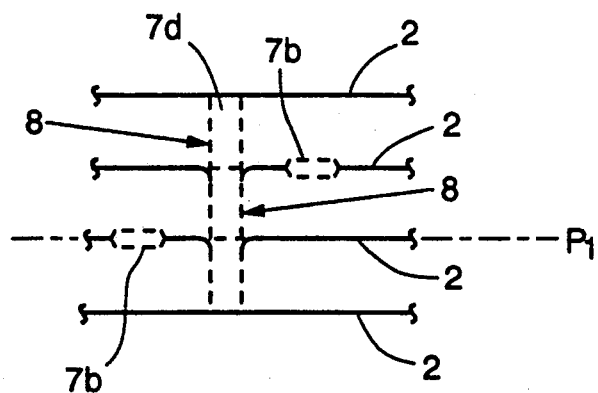
FIG. 4 shows a transverse cross-section of an area of the pad shown at IV in FIG. 1.

The layers 2 in the heat sink area 4 can be interengaged with each other by various securing means 7. For instance, the layers 2 can be in contact with each other in the heat sink area 4 and the securing means 7 can comprise a mechanical bond 7b (as shown in FIG. 4) between the layers in at least part of the heat sink area. The securing means 7 can also comprise adhesive 7c between the layers 2. If adhesive is used to secure the layers together in the heat sink area 4, it is desirable that the adhesive have a thickness of about ½ mils or less so that heat transfer between the layers 2 will not be affected. The securing means 7 can also comprise one or more staples (not shown) for mechanically securing the layers together in the heat sink area 4. As pointed out earlier, the heat sink area can comprise a compressed area of the stack, that is, at least one of the layers 2 can include embossments 6 thereon which are compressed in the heat sink area. In this case, the embossments which are flattened will metallurgically and mechanically bond to the adjacent layer 2. The securing means 7 can also comprise at least one opening 7d defined by sheared surfaces 8 of the layers 2, each of the sheared surfaces 8 extending in the vertical direction above and below a plane $P_1$ which is coplanar with facing surfaces of two of the layers 2. The securing means 7 can also comprise frame means 9 for supporting the heat sink area 4, the frame means including an open frame (not shown) or a pan including a recess 9a therein which receives the stack 3 of sheets 2 as shown in FIG. 5. As shown in FIG. 2, a top sheet of the stack 3 can extend over the outer edges of the sheets 2 in the heat sink area 4, the top sheet including a portion 7a which is crimped or otherwise secured beneath a bottom one of the sheets 2 as shown in FIG. 2. A hermetic seal can be provided around the outer edges of the stack 3 and the interior of the pad can include a gas such as Xenon to provide low heat transfer between the layers 2. Another way of securing the layers in the heat sink area is simply by providing a crimped edge.

The pad 1 can include two layers 2 only one of which includes the embossments 6. In a preferred embodiment, however, at least two of the layers adjacent to each other include a pattern of the embossments 6, the layers 2 being offset with respect to each other such that at least some of the embossments are not aligned in the vertical direction. With this arrangement, the layers 2 can be provided in point contact to minimize heat transfer therebetween in the vertical direction A. The embossments 6 can be provided in uniform patterns or nonuniform patterns on the sheet Furthermore, the embossments 6 can be provided such that they extend into only one surface of the sheets or the embossments ca be provided such that they extend into both surfaces of the sheets as shown by layer 2b in FIG. 5. Layer 2a in FIG. 5 shows a uniform pattern of embossments 6 whereas layer 2b snows a uniform pattern of embossments 6 on one side thereof and a non-uniform pattern of embossments 6 on the other side thereof. Likewise, layer 2d includes embossments 6 in a non-uniform pattern and the embossments 6 on the layer 2d can have a height which is greater than the embossments 6 on the sheet 2a. The layer 2b can include embossments 6 of various heights and one or more layers 2 can be flat such as the layer 2c. In the arrangement shown in FIG. 2, the embossments 6 on one side of a medial plane $P_2$ passing through the pad face away from the medial plane, the medial plane being perpendicular to the vertical direction. The embossments 6 form depressions on one side of a respective one of the layers 2 and bumps or projections on an opposite side of the respective layer.

At least one of the layers can include heat radiating means 10 thereon. The heat radiating means 10 can comprise a black surface on at least part of at least one side of at least one of the layers. For instance, the heat sink area 4 can be coated with the black surface 10 or various parts of the pad 1 can include the black surface 10 as shown in FIG. 3. As mentioned earlier, the black surface allows the pad 1 to radiate 95% of the heat whereas if the aluminum foil remains bright only 10% of the heat is radiated. Accordingly, the black coating 10 can be provided in areas at which it is desired to radiate heat away from the pad. As an example, if one side of the pad faces a heat source it would be desirable to leave that surface bright to reflect heat back towards the heat source and if a heat sensitive component was located on the opposite side of the pad it would be desirable to leave that surface bright also to prevent heat from radiating towards the component. On the other hand, if the outer edges of the pad are located in an area at which air freely circulates, it would be desirable to compress the pad in those areas to provide heat sink areas 4 and provide the black coating thereon to enhance dissipation of heat from the pad in those areas. If one surface of the pad faces a heat source and the opposite side of the pad faces an open area at which a heat sensitive component is not located, it may be desirable to coat the entire surface of the pad facing away from the heat source. Furthermore, one or more of the interior layers of the pad can be coated with the heat radiating means 10 in any desired pattern on one side or both sides thereof. The coating 10 thus cooperates with the heat sink area 4 to direct heat to a desired area on the pad. Typically, the coating 10 can be provided on the lower layers of the pad facing the heat source and will extend to the heat sink area 4 to conduct heat away from the heat source.

The pad can also include at least one layer of scrim 11 as illustrated in FIG. 2. The scrim can comprise a heat resistant material such as flame retardant polyester ("FRPE"). The scrim is typically about one mil or less in thickness and of a fabric material. The scrim 11 can be provided within 1-2 layers of the top of the pad. Furthermore, the scrim can comprise refractory paper, a fiberglass non-woven fabric, a ceramic non-woven fabric or other suitable material.

In accordance with a preferred embodiment of the invention, the foregoing pad can be made by the steps of assembling a plurality of layers 2 of metal foil in a stack 3 wherein the layers are arranged one above another in a vertical direction A, at least two of the layers being separated from each other by a plurality of embossments 6 on at least one of the layers and a step of compressing the stack such that heat sink 4 and insulating areas 5 are formed therein with the layers being closer together in the vertical direction in the heat sink area 4 than in the insulating area 5.

The method according to the invention can also include a step of embossing a plurality of the layers 2 such that a plurality of the embossments 6 are formed therein, the embossing step being performed by simultaneously embossing a plurality of overlapping sheets 2 of the metal foil, each of the sheets after the embossing step comprising a respective one of the layers. The embossments can be provided in a random or uniform repeating pattern. It is also within the scope of the invention to emboss each sheet separately. The embossments can be provided by passing a single sheet or a stack of sheets between a pair of rollers having the desired embossment pattern thereon. The embossments can have the same heights or varying heights on individual sheets or the sheets can be provided such that one sheet has embossments having a height greater than the embossments on another sheet. The embossments can extend outwardly from only one side of the sheet or can extend outwardly from both sides of the sheet. The preferred metal foil used for each layer is aluminum having a thickness of about 2 mils but the thickness of the sheets can be adjusted to suit the needs of the pad. For instance, thicker sheets provide better lateral heat transfer. It is also within the scope of the invention to provide sheets which are thicker in parts thereof at which better lateral heat transfer is desired.

The method of the invention can also include a step of securing the layers together in the heat sink area 4. The securing step can include hermetically sealing the heat sink area, stapling the heat sink area with one or more staples, crimping the layers along the heat sink area, providing a mechanical bond in the heat sink area and/or by metallurgical bonding of the individual layers to each other (such as by ultrasonic welding which causes the Al oxide layer on the aluminum to be removed and the individual layers to be bonded to each other), applying an adhesive between the layers in the heat sink area, and/or any other suitable securing means. If the pad be provided between the layers in the insulating area 5.

Figure 8:
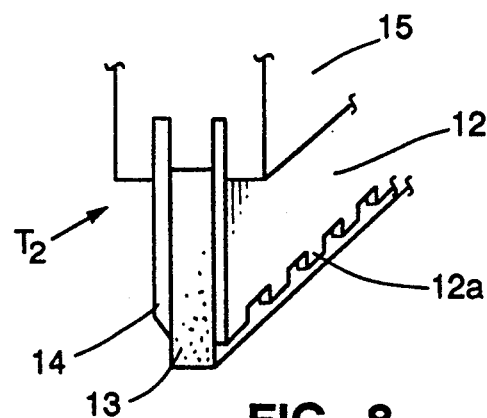
FIG. 8 shows a perspective view of a composite tool comprising a cutter, a compressible material and a punch having a plurality of spaced-apart teeth used for simultaneously cutting the outer edge of the pad, compressing the pad to form the heat sink area and securing the layers of the pad together in the heat sink area.

In accordance with a preferred embodiment of the method of the invention, the step of securing the layers together in the heat sink area can comprise interengaging the layers with each other by forming at least one opening 7d extending in the vertical direction through the layers in the heat sink area, the at least one opening 7d being formed by passing a punch 12 through the layers. The at least one opening 7d can comprise a plurality of openings as shown in FIG. 1. The punch can include a plurality of spaced-apart projections or teeth 12a, each of which forms a respective one of the openings 7d. The compressing and securing steps can be simultaneously performed with a composite tool $T_2$ comprising a compressible material 13 which performs the compressing step and the punch 12 which performs the securing step, the compressible material 13 and the punch 12 being mounted together in side-by-side relationship as shown in FIG. 8. The compressible material can comprise an elastomeric material such as a natural on synthetic rubber or a spring loaded metal part such as a metal ring.

Figure 7:
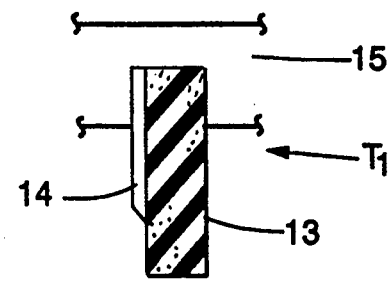
FIG. 7 shows a composite tool comprising a cutter and a compressible pad for simultaneously compressing the heat sink area and cutting an outer edge of the pad.

In accordance with another preferred embodiment of the method according to the invention, a step of cutting the stack 3 can be provided such that the heat sink area 4 lies between the insulating area 5 and an outer edge 1a of the stack 3. The cutting step can be performed as a separate step or simultaneously with the compressing step or simultaneously performed with the compressing and securing steps. For instance, the cutting step can be performed with a tool $T_1$ comprising a cutter 14 mounted in side-by-side relationship with the compressible material 13 on a suitable holder 15, as shown in FIG. 7. With this arrangement, the compressible material 13 will strike the stack 3 prior to contact therewith with the cutter 14, the compressible material 13 will deform as it compresses the stack to form the heat sink area 4 and then the cutter 14 trims the outer edge 1a of the pad 1. In the case where the cutting, compressing and securing steps are simultaneously performed, the composite tool $T_2$ shown in FIG. 8 can be used. As shown in FIG. 8, the composite tool $T_2$ includes the punch 12 having the spaced-apart projections 12a, the compressible material 13 and the cutter 14, all of which are mounted in side-by-side relationship. With the tool $T_2$, the cutting, compressing and securing steps can be performed such that the compressible material 13 contacts the stack 3 before the cutter 14 and the punch 12 contact the stack during the simultaneous cutting, compressing and securing steps, the compressible material 13 being compressed to a predetermined amount and compressing the stack 3 in the heat sink area 4 when the cutter 14 cuts the stack and the punch 12 punches the openings 7d.

Also in accordance with the method of the invention, a step of inserting at least one scrim layer 11 in the stack 3 can be provided. In this case, one or more layers of scrim 11 can be provided between individual layers 2 of the stack 3.

Also in accordance with the method of the invention, a step of coating at least part of at least one of the layers 2 with heat radiating means 10 can be provided. The heat radiating means 10 preferably comprises a black coating and the coating step can comprise coating at least part of the heat sink area with the black coating 10. However, various parts of the individual layers 2 or outer surfaces of the pad 1 can be coated with the heat radiating means 10 depending on the desired heat transfer characteristics of the pad.

EXAMPLE 1

A pad in accordance with the invention includes five layers of aluminum foil, the top and bottom layers being 2 mils (0.002") in thickness and the three intermediate layers being 0.8 mils (0.0008") in thickness. The overall size of the pad is 12" wide by 20" long and the pad is about 5 mm in thickness. The heat sink area can be 3–10 mm in width, e.g. 6 mm. The embossments are about 1 mm in height and the pad can be protected by a pan having a thickness of about 20 mils (0.02"). The top sheet can extend over the edges of the pan to hold the pad in a recess in the pan. The pan is useful for protecting the pad from rocks, etc. if the pad is mounted on the underside of a vehicle.

While the invention has been described with reference to the foregoing embodiments, changes and variations may be made thereto which fall within the scope of the appended claims.

We claim:

1. A method of making a heat insulating pad having insulating and heat sink areas, comprising:

a step of assembling a plurality of layers of metal foil in a stack wherein said layers are arranged one above another in a vertical direction, at least two of said layers being separated from each other by a plurality of embossments on at least one of said layers;

a step of compressing at least one portion of said stack such that heat sink and insulating areas are formed therein with said layers providing better heat conduction in said vertical direction at said heat sink area than at said insulating area, said embossments in said insulating area separating said layers so as to provide a gap therebetween; and a step of securing said layers together in said heat sink area, said securing step including interengaging said layers in said heat sink area with each other.

2. The method of claim 1, further comprising a step of embossing a plurality of said layers such that a plurality of said embossments are formed therein, said embossing step being performed by simultaneously embossing a plurality of overlapping sheets of said metal foil, each of said sheets after said embossing step comprising a respective one of said layers.

3. The method of claim 2, wherein said assembling step comprises separating said sheets after said embossing step and offsetting them with respect to each other such that at least some of said embossments on two of said sheets facing each other are not aligned in said vertical direction.

4. The method of claim 1, wherein said step of securing said layers together in said heat sink area includes hermetically sealing said heat sink area.

5. The method of claim 1, wherein said securing step comprises forming a plurality of openings extending in said vertical direction through said layers in said heat sink area by passing a punch through said layers, said punch including a plurality of spaced-apart projections, each of which forms a respective one of said openings and said compressing and securing steps being simultaneously performed with a composite tool comprising a compressible material which performs said compressing step and said punch which performs said securing step, the compressible material and the punch being mounted together in side-by-side relationship.

6. The method of claim 1, further comprising a step of cutting said stack such that said heat sink area lies between said insulating area and an outer edge of said stack, said cutting step being performed simultaneously with said compressing and securing steps.

7. The method of claim 6, wherein said cutting, compressing and securing steps are simultaneously performed with a composite tool comprising a compressible material for compressing said layers, a punch for securing said layers by forming at least one opening therein and a cutter for cutting said layers, said compressible material being mounted between said cutter and said punch, said compressible material contacting said stack before said cutter and said punch contact said stack during said simultaneous cutting, compressing and securing steps, said compressible material being compressed to a predetermined amount and compressing said stack in said heat sink area when said cutter cuts said stack and said punch punches said at least one opening.

8. The method of claim 1, further comprising a step of inserting at least one scrim layer in said stack.

9. The method of claim 1, further comprising a step of coating at least part of at least one of said layers with heat radiating means.

10. The method of claim 9, wherein said heat radiating means comprises a black coating and said coating step comprises coating at least part of said heat sink area with said black coating.

11. A method of making a heat insulating pad having insulating and heat sink areas, comprising:
a step of assembling a plurality of layers of metal foil in a stack wherein said layers are arranged one above another in a vertical direction, at least two of said layers being separated from each other by a plurality of embossments on at least one of said layers; and
a step of compressing at least one portion of said stack such that heat sink and insulating areas are formed therein with said layers providing better heat conduction in said vertical direction at said heat sink area than at said insulating area, said embossments in said insulating area separating said layers so as to provide a gap therebetween.

12. The method of claim 11, further comprising a step of embossing a plurality of said layers such that a plurality of said embossments are formed therein, said embossing step being performed by simultaneously embossing a plurality of overlapping sheets of said metal foil, each of said sheets after said embossing step comprising a respective one of said layers.

13. The method of claim 12, wherein said assembling step comprises separating said sheets after said embossing step and offsetting them with respect to each other such that at least some of said embossments on two of said sheets facing each other are not aligned in said vertical direction.

14. The method of claim 11, further comprising a step of securing said layers together in said heat sink area, said securing step including hermetically sealing said heat sink area.

15. The method of claim 11, further comprising a step of inserting at least one scrim layer in said stack.

16. The method of claim 11, further comprising a step of coating at least part of at least one of said layers with heat radiating means.

17. The method of claim 16, wherein said heating radiating means comprises a black coating and said coating step comprises coating at least part of said heat sink area with said black coating.

18. The method of claim 11, wherein said assembling step comprises assembling a plurality of layers of aluminum, copper or gold foil having a thickness of no greater than about 2 mils.

19. The method of claim 11, wherein said assembling step comprises assembling a plurality of layers of metal foil which make said pad flexible.

* * * * *